(12) United States Patent
Wang et al.

(10) Patent No.: US 7,563,484 B2
(45) Date of Patent: *Jul. 21, 2009

(54) PERMEABLE POLYANILINE ARTICLES FOR GAS SEPARATION

(75) Inventors: Hsing-Lin Wang, Los Alamos, NM (US); Benjamin R. Mattes, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 838 days.

This patent is subject to a terminal disclaimer.

(21) Appl. No.: 10/953,673

(22) Filed: Sep. 28, 2004

(65) Prior Publication Data

US 2005/0037149 A1 Feb. 17, 2005

Related U.S. Application Data

(60) Division of application No. 09/792,514, filed on Feb. 23, 2001, now Pat. No. 6,797,325, which is a continuation-in-part of application No. 09/668,556, filed on Sep. 22, 2000, now Pat. No. 6,429,282, which is a continuation-in-part of application No. 09/334,719, filed on Jun. 16, 1999, now Pat. No. 6,123,883, which is a division of application No. 08/926,338, filed on Sep. 5, 1997, now Pat. No. 5,981,695, which is a continuation of application No. 08/658,928, filed on May 31, 1996, now abandoned.

(51) Int. Cl.
- *B05D 3/02* (2006.01)
- *C08G 73/06* (2006.01)
- *C08J 3/00* (2006.01)

(52) U.S. Cl. .................. 427/387; 528/422; 528/499

(58) Field of Classification Search ................ 528/422, 528/499; 427/387
See application file for complete search history.

(56) References Cited

U.S. PATENT DOCUMENTS

| | | | |
|---|---|---|---|
| 4,818,254 A | | 4/1989 | Anand et al. |
| 5,215,554 A | * | 6/1993 | Kramer et al. .............. 95/47 |
| 5,312,686 A | * | 5/1994 | MacDiarmid et al. ....... 428/364 |
| 5,358,556 A | * | 10/1994 | Kaner et al. ................ 95/45 |
| 5,519,111 A | * | 5/1996 | MacDiarmid et al. ....... 528/422 |

OTHER PUBLICATIONS

"Membrane Separation Systems", U.S. Department of Energy, DE 90-011771 (1990).
J. Haggin, "New Generation of Membranes Developed for Industrial Separations", Chem. Eng. News 66, 7 (1988).
R. W. Baker, "Membrane Separation Systems: A Research & Development Needs Assessment", U.S. Department of Energy, DE 90-011770 (1990).
M.R. Anderson et al., "Conjugated Polymer Films For Gas Separations", Science 252, 1412 (1991).
L. Rebattet et al., "Effect of Doping Treatment on Gas Transport Properties and on Separation Factors of Polyaniline Membranes", J. Appl. Polym. Sci. 57, 1595 (1995).
J. M. S. Henins and M. R. Tripodi, "Composite Hollow-Fiber Membranes for Gas Separation: The Resistance Model Approach", J. Membr. Sci. 8, 233 (1981).
T. Vikki et al., "Thermoreversible Gels of Polyaniline: Viscoelastic and Electrical Evidence on Fusible Network Structures", Macromol. 30, 4064 (1997).
S. Kuwabata and C.R. Martin, "Investigation of the Gas-Transport Properties of Polyaniline", J. Membrane Sci. 91, 1 (1994).

* cited by examiner

*Primary Examiner*—Tae H Yoon
(74) *Attorney, Agent, or Firm*—Samuel M. Freund; Juliet A. Jones

(57) ABSTRACT

Immersion precipitation of solutions having 15%-30% (w/w) and various molecular weights of the emeraldine base form of polyaniline in polar aprotic solvents are shown to form integrally skinned asymmetric membranes and fibers having skin layers <1 μm thick which exhibit improved rates of gas transport while preserving good selectivity. These membranes can be further transformed by an acid doping process after fabrication to achieve excellent permeation rates and high selectivities for particular gas separations. Prior to the use of concentrated EB solutions, the formation of integrally skinned asymmetric membranes was not possible, since films and fibers made from <5% w/w polyaniline solutions were found to disintegrate during the IP process.

12 Claims, 3 Drawing Sheets

PERMEABLE POLYANILINE ARTICLES FOR GAS SEPARATION

CROSS REFERENCE TO OTHER APPLICATIONS

The present continuation-in-part patent application claims the benefit of application Ser. No. 09/668,556 filed on Sep. 22, 2000 now U.S. Pat. No. 6,429,282, which is a continuation-in-part of Ser. No. 09/334,719 filed on Jun. 16, 1999 now U.S. Pat. No. 6,123,883, which is a Divisional of Ser. No. 08/926,338 filed on Sep. 5, 1997 now U.S. Pat. No. 5,981,695, which is a file wrapper continuation patent application of Ser. No. 08/658,928 filed on May 31, 1996 now abandoned.

RELATED APPLICATION

This application is a divisional of Ser. No. 09/792,514, filed Feb. 23, 2001 now U.S. Pat. No. 6,797,325 by Hsing-Lin Wang et al.

STATEMENT REGARDING FEDERAL RIGHTS

This invention was made with government support under Contract No. W-7405-ENG-36 awarded by the U.S. Department of Energy to The Regents of The University of California. The government has certain rights in the invention.

FIELD OF THE INVENTION

The present invention relates generally to gas separation and, more particularly to the use of integrally skinned asymmetric permeable polyaniline membranes and hollow fibers for separating gases.

BACKGROUND OF THE INVENTION

Membrane-Based Chemical Separation (MBCS) systems have experienced rapid growth in U.S. industries (e.g., Monsanto, DuPont, Dow, and Union Carbide) over the past two decades and are used to separate and purify many high volume chemicals. Broadly stated, a membrane is a barrier material that allows for selective transport. High-profile chemical separations achieved with state of the art commercial membrane systems include: (1) size dependent particle removal filtration from fluid streams; (2) water desalination by reverse osmosis; (3) organic/organic separations and solvent dehydration by pervaporation; and (4) gas separations for hydrogen recovery, nitrogen production, and acid gas removal from natural gas streams. New materials with higher rates and selectivities are required by industry to advance MBCS technologies. MBCS systems permit: (a) high throughput and high selectivity to efficiently concentrate individual components from complex mixtures; (b) small numbers of mechanical parts; and (c) low capital and operating costs due to significantly reduced energy requirements. Because of these advantages, MBCS systems occupy an important place in separation technologies and are attractive for commercial process operations.

The process of separating pure components from a mixture of gases is of great industrial importance. Current gas separation technologies have several shortcomings which include high capital costs, poor energy efficiency, and generation of secondary pollution. Two principal gas separation techniques in use today are cryogenic distillation and pressure-swing gas adsorption. Membrane-based separations have more recently been proven to be economically competitive with these methods while possessing several advantages including reduced energy costs and large reductions in secondary pollution. Moreover, improvements in membrane separation systems may lead to significant savings for the energy industry. Advanced membrane systems for enriched oxygen and nitrogen production alone could save 0.4 quad units of energy per year. See, e.g., "Membrane Separation Systems", U.S. Department of Energy, DE 90-011771 (1990). New membrane systems needed to advance gas separation technology should be: (a) environmentally stable; (b) easy to manufacture and maintain; (c) low in cost; and, most importantly, (d) capable of combining high gas selectivity with high gas flux.

Air separation systems based on gas selective polymer membranes have now been commercialized by several U.S. companies. These are important separations since nitrogen and oxygen are the second and third largest commodity chemicals produced in the United States. See, e.g., J. Huggin, Chem. Eng. News 66, 7 (1988). The first commercial air separation systems used conventional engineering polymers for $O_2/N_2$ separations with selectivities in the range of 2-4. Current technology employs membranes with separation factors of 6-7, and an oxygen permeability of 2 Barrers. See, e.g., U.S. Pat. No. 4,840,646 which issued to J. N. Anand et al. on Jun. 20, 1989. A recent report prepared by the U.S. Department of Energy states that if stable membranes are developed with an oxygen/nitrogen separation factor of 20 and an oxygen permeability of 10 Barrers, such systems would completely displace present day cryogenic air separations. A membrane with these qualities would readily allow compressed air to be enriched to >75% oxygen or produce nitrogen of >99.9% purity. Energy costs saved in oxygen and nitrogen production, and those saved from enhanced combustion processes, would equal the energy equivalent to $10^5$ to $10^6$ barrels of oil per day. See, e.g., "Membrane Separation Systems: A Research Needs Assessment" by W. Koros, U.S. Department of Energy, DE 90-011770 (1990). Other important commercial gas separations include the recovery of hydrogen and the separation of nitrogen, helium, hydrogen, and carbon dioxide from natural gas.

The conjugated polymer polyaniline is stable in both its undoped and doped states and has a simple and completely reversible acid/base doping chemistry. Permeability tests on thick (25 to 50 μm) as-cast polyaniline films have shown that gases of different kinetic diameters permeate at different rates leading to high selectivity ratios for important gas pairs such as oxygen/nitrogen, hydrogen/nitrogen, and carbon dioxide/methane. See, e.g., "Conjugated Polymer Films For Gas Separations" by M. R. Anderson et al., Science 252, 1412 (1991). By partially doping polyaniline, a highly selective membrane was formed. Two recent papers have confirmed that partially doped polyaniline has the highest known oxygen/nitrogen selectivity and lies above an "upper bound" permselective behavior for both glassy and rubbery polymers. See, e.g., S. Kuwabata and C. R. Martin, J. Membrane Sci. 91, 1 (1994) and L. Rebattet et al., J. Appl. Polym. Sci. 57, 1595 (1995). The commercial potential for gas-selective polyaniline membranes has been limited, however, since there are no reports where a sufficiently thin skin (<1 μm) has been generated to achieve commercially significant gas transport rates. Since gas flux is inversely proportional to the thickness of a barrier membrane, the thinnest possible nonporous polymer layer is desired. Suitable membranes must also be able to withstand pressures of up to 100 atmospheres or more. Separations are therefore generally carried out using asymmetric membranes in which a thin layer or skin of polymer is grown on a porous structural support (asymmetric composite), or where both the thin separating layer and the porous support are the same polymer (integrally skinned asymmetric membrane or ISAM).

Accordingly, it is an object of the present invention to provide a robust, stable permeable polyaniline membrane having a significant gas transport rate and significant gas transport selectivity.

Another object of the present invention is to provide a robust, stable permeable polyaniline hollow fiber having a significant gas transport rate and significant gas transport selectivity.

Still another object of the invention is to provide a robust, stable permeable polyaniline membrane having a significant gas transport rate and oxygen/nitrogen, hydrogen/nitrogen and carbon dioxide/methane gas selectivities.

Yet another object of the present invention is to provide a robust, permeable polyaniline hollow fiber having a significant gas transport rate and oxygen/nitrogen, hydrogen/nitrogen and carbon dioxide/methane gas selectivities.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein the method for preparing integrally skinned asymmetric membranes (ISAMs) hereof includes: forming a solution having between 15% and 30% w/w of the EB form of polyaniline; pouring the solution onto a substrate forming thereby a membrane; and immersing the membrane in a nonsolvent for polyaniline, thereby causing the EB form of polyaniline to precipitate forming an ISAM having a permeable dense skin in the vicinity of the surface of contact of the membrane with the nonsolvent, and a lower density porous support portion.

It is preferred that the nonsolvent for polyaniline includes water.

Preferably, the permeable dense skin is caulked by applying a coating of polydimethylsiloxane thereto.

In another aspect of the present invention in accordance with its objects and purposes, the method for preparing integrally skinned, porous asymmetric hollow fibers hereof includes: forming a solution having between 15% and 30% w/w of the EB form of polyaniline; extruding the solution through the outer bore of a hollow fiber spinnerrette nozzle; passing the solution through an air-gap; and subsequently directing the extruded solution into a coagulation bath containing a nonsolvent for polyaniline, whereby an asymmetric hollow fiber having a permeable dense skin in the vicinity of the surfaces thereof which contact the nonsolvent and a lower-density porous interior support portion is formed.

It is preferred that the nonsolvent for polyaniline includes water.

Preferably, the outer surface of the hollow fiber is caulked by applying a coating of polydimethylsiloxane thereto.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
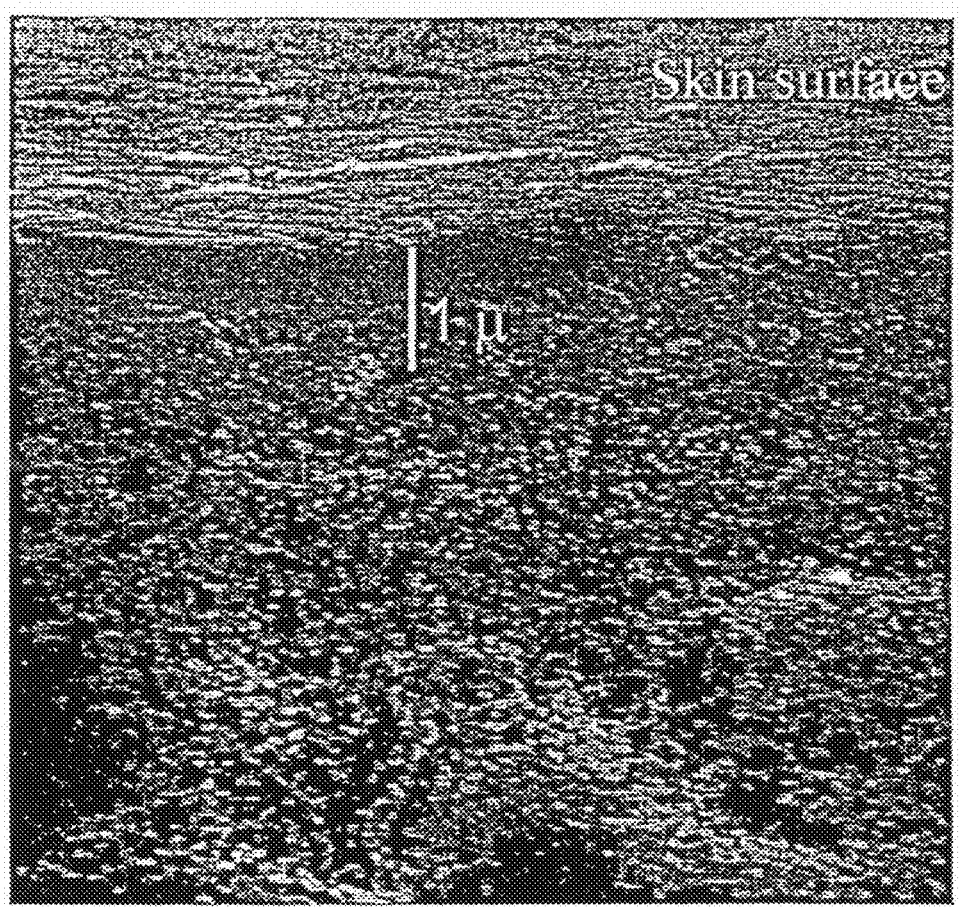
FIG. 1 is a scanning electron microscopy (SEM) photomicrograph of the cross-section of a film made in accordance with the teachings of the present invention showing a thin, nonporous layer located on the surface and a porous substructure generated throughout the bulk of the film.

Briefly, the present invention includes the use of solutions having 15%-30% (w/w) and various molecular weights of the emeraldine base form of polyaniline in polar aprotic solvents for forming gas permeable integrally skinned asymmetric membranes and hollow fibers (ISAMs). As described in detail in the above-identified Cross-Referenced Applications, organic bases added to these solutions are found to enhance polymer solubility and inhibit otherwise rapid gelation. Permeable flat membranes and hollow-fibers having gas-selective skin layers <1 μm thick have been generated by immersion precipitation (IP) which exhibit improved rates of gas transport while preserving good selectivity. These membranes can be further transformed by an acid doping process after fabrication to achieve excellent gas permeation rates and high selectivities for particular gas separations. Prior to the use of concentrated EB solutions the formation of integrally skinned asymmetric flat membranes and hollow fibers were not possible, since films and fibers made from <5% w/w polyaniline solutions would disintegrate during the IP process.

Immersion precipitation of highly concentrated polyaniline solutions results in ISAMs due to the solvent-nonsolvent exchange process. The thin, dense, skin layer is formed at the interface between the liquid film (before solidification) and the nonsolvent, such as water. This layer forms on a more porous substrate layer and is useful for separating certain gas mixtures into more concentrated gas components. However, in virtually all syntheses of such films, the resulting ISAM has defects in the skin surface. When the total defect area is greater than about 0.1% of the total surface area of the skin, the membrane cannot be used for gas separations since the selectivity is approximately unity. This is because the entire gas mixture will preferentially flow through the defect sites rather than through the dense skin which would otherwise permit smaller molecules to diffuse more rapidly than larger molecules. Hennis and Tripodi proposed the use of polydimethylsiloxane, a high flux polymeric material layer to fill the defect sites on the skin surface. The effect is achieved by spraying one surface of a membrane, or by dipping a hollow fiber into the liquid polydimethylsiloxane. In this manner, the effect of defects on the skin surface can be minimized, thereby permitting intrinsic selectivity of the permeable membrane to be exercised.

Permeability measurements on ISAMs and hollow fibers made in accordance with the present invention were performed using the pressure decay for pure gases.

Measurements were made for He, $H_2$, $O_2$, $N_2$, $CO_2$, Ar and $CH_4$.

High-molecular weight ($M_w \geq 120,000$) Polyaniline was synthesized by oxidative polymerization at $-45°$ C. Medium-molecular weight polyaniline (100,000≦$M_w$<120,000) was purchased from manufactures thereof. It is preferred to use high-molecular weight EB for forming immersion precipitation films and hollow fibers.

Reference will now be made in detail to the present preferred embodiments of the invention, examples of which are illustrated in the accompanying drawings.

In a first embodiment of the present invention, ISAMs were prepared from the EB form of polyaniline by the phase inversion process. A nonsolvent gel inhibitor (GI) is added to a solvent for polyaniline EB to prevent gelation once the EB is added. One particularly good solvent for polyaniline EB, N-methyl pyrrolidinone (NMP), is used extensively in what follows hereinbelow. The resulting solution is poured onto a glass plate forming a wet film. Approximate film thickness is determined by passing an adjustable Gardner blade over the wet film. The membrane is subsequently immersed in a water bath which causes the polymer to precipitate with a permeable thin skin and an underlying porous substrate. This substructure is formed by percolation pathways produced by the rapid solvent exchange between the polymer solvent (NMP) and the water in the coagulation bath. The membrane is then immersed in a methanol bath to extract residual solvent, dried in a vacuum oven, coated with a layer of silicon elastomer, and tested for gas permeation.

FIG. 1 shows different regions of the films cross-section as visualized by scanning electron microscopy (SEM). It is clear from the SEM output that there is a thin nonporous layer located on the surface with a porous substructure situated throughout the bulk of the film. The casting knife setting was adjusted to give a wet film thickness in the range from 25 to 40 mil. Each wet film sample was either exposed to a controlled relative humidity chamber containing 75% to 90% water or immersed immediately after casting into a coagulation bath, typically water. The dielectric properties of the coagulation bath were controlled by adding inorganic salts or alcohol to effect the rates of demixing during precipitation.

Figure 2:
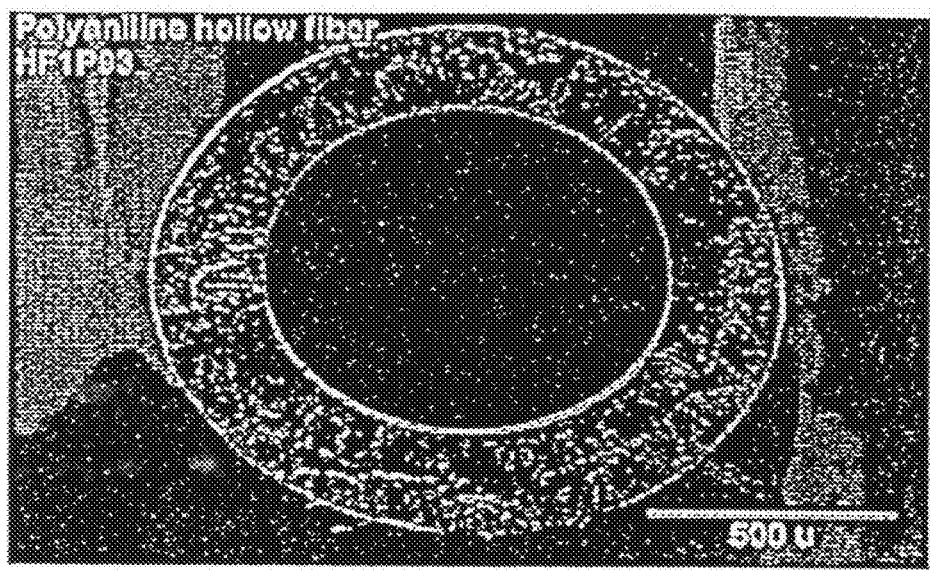
FIG. 2 is a SEM photomicrograph of a typical EB ISAM hollow fiber showing a thin, nonporous layer located on the inner and outer surfaces of the fiber and a porous substructure generated throughout the bulk interior of the fiber.

In another embodiment of the present invention, polyaniline and its derivatives are dissolved in solvent/nonsolvent systems at concentrations high enough (18-30%) to enable the production of hollow fibers. Briefly, the polymer solution is extruded through the outer bore of a hollow fiber spinnerrette nozzle, while a nonsolvent for the polymer, such as water, is simultaneously co-injected through the inner bore of the nozzle. The extruded solution is then passed through an air-gap and into a coagulation bath which precipitates the polymer with an asymmetric wall structure. The asymmetry can be controlled to give structures with: a) a thin "pin-hole" free skin resting on top of a porous substructure (ISAM); b) a nanoporous structure; c) an ultraporous structure; or microporous structures. The fiber is taken up through a series of baths which removes the solvents and nonsolvents via the uptake reel of a Leesona winder. Typically, solution compositions that yield good flat sheet ISAMs are easily modified to suitable compositions for hollow fiber production. Hollow fibers spun from conjugated polymers have been fabricated into test modules suitable for field testing. FIG. 2 shows the SEM output from a typical EB ISAM hollow fiber.

Having generally described the invention, the following EXAMPLES provide greater detail. Gel inhibitors used in these EXAMPLES include primary, secondary and tertiary amines as follows: the primary amine: n-Butylamine; the secondary amines: 2,5-Dimethyl-3-pyrroline, 3,3-Dimethylpiperidine, Heptamethyleneimine, Diisopropylamine, Hexamethyleneimine, N-ethylbenzylamine, piperazine, 2,6-Dimethylmorpholine, Piperidine, and Dibutylamine; the tertiary amines: N-Methylpiperidine, N,N'-Dimethylpiperazine, and Triethylamine; and an amine having a bifunctional group: Diethylnipecotinamide.

EXAMPLE 1

Gas Permeability of ISAMs Prepared from Highly Concentrated, High-Molecular Weight ($M_w$≧120,000) Polyaniline Emeraldine Base Solutions Using Secondary Amines as Gel Inhibitors:

To a solution of 1.416 g of NMP and 171 mg of piperazine, 300 mg of high-molecular weight (HMW) polyaniline EB prepared at −45° C. was added, the resulting mixture stirred for a few minutes and placed in an oven at 58° C. for approximately 5 min. until a homogeneous solution was formed. The mass content of HMW EB in this solution was ~15.9% w/w. Once the solution was formed, it was spread onto a glass plate and the wet film was drawn by setting the draw-down blade at 0.006 in. The film was then immersed in 15° C. water nonsolvent. The IP film was kept in the water for 24 h, air dried for a few hours and then placed overnight in a vacuum oven. A 100% silicon elastomer caulking layer was then applied to the membrane surface and allowed to dry overnight before the membrane was placed inside the test cell held at 27° C. for measurements of the gas permeation properties. Table 1 shows that the membrane selectivities for $O_2/N_2$ fall in the range between 6 and 8. This is consistent with the selectivity of an EB dense membrane.

EXAMPLE 2

Gas Permeability of ISAMs Prepared from >20% w/w of Medium-Molecular Weight (100,000≦$M_w$<120,000) EB Polyaniline Solutions:

To a solution containing 6.237 g of NMP and 593 mg of heptamethyleneimine, 1.790 g of medium-molecular weight EB polyaniline (from Monsanto, Inc.) was added, the mixture stirred for a several minutes and placed in an oven at 55° C. oven for approximately 25 min. when a homogeneous solution was formed. The mass content of HMW EB in this solution was ~20.8% w/w. Once the solution was formed, it was spread onto a glass plate and the wet film was drawn by setting the draw down blade to at 0.006 in. It was then immersed in 17° C. water, where it was kept for 24 hours, air dried for several hours and placed inside a vacuum oven overnight. A 100% silicon elastomer caulking layer was applied to the membrane surface and dried overnight before being placed inside the test cell at 27° C. for measurement of the gas permeation properties. Table 2 shows the results of these measurements.

EXAMPLE 3

Gas permeability of the ISAM Membrane Prepared from >20% w/w of Medium-Molecular Weight (100,000≦$M_w$<120,000) EB Polyaniline Solutions from a Second Commercial manufacturer thereof:

To a solution of 3.166 g of NMP and 150 mg of 3,3-dimethylpiperidine, 911 mg of medium-molecular weight EB polyaniline (from NESTE Oy, Inc.) was added, the mixture stirred for several minutes and placed in an oven at 60° C. for approximately 20 min. until a homogeneous solution was formed. The mass content of NESTE EB in this solution was ~21.6% w/w. The solution was poured onto a glass plate and the wet film was drawn by setting the draw down blade to 0.006 in. It was then immersed in water at 15° C. where it was kept for 24 h. The IP film was air dried for several hours and placed in a vacuum oven overnight. A 100% silicon elastomer caulking layer was applied to the membrane surface and dried overnight before being placed inside the test cell to measure the gas permeation properties at 27° C. Table 3 shows the results of these measurements. It may be observed that the selectivity for $O_2/N_2$ gas pairs from these membranes is between approximately 7 and 9.

Figure 3:
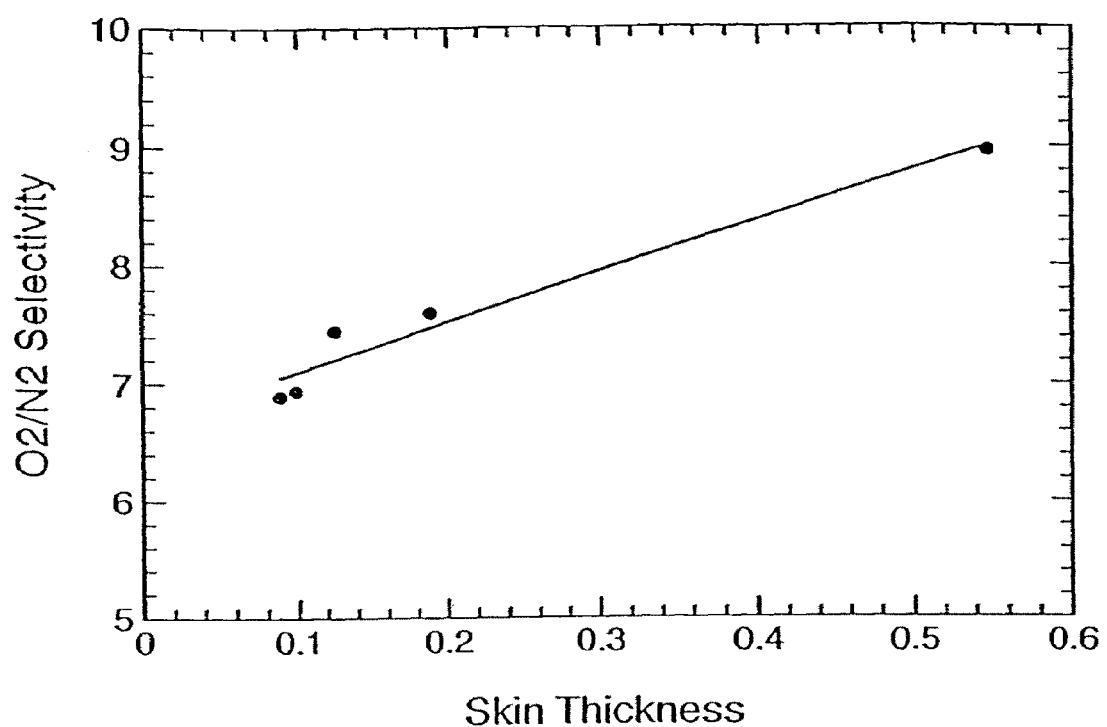
FIG. 3 is a graph of $O_2/N_2$ selectivity as a function of polyaniline skin thickness.

The gas permeability for various skin thickness for polyaniline membranes prepared from solutions in which GIs were used with NMP solvent was investigated. FIG. 3 is a graph of the $O_2/N_2$ selectivity versus polyaniline membrane skin thickness and shows that selectivity of $O_2/N_2$ is an approximately linear function of the thickness of the membrane. The average skin thickness is estimated to vary between 0.088 μm and 0.547 μm. and was derived from the average value of the apparent skin thickness obtained from $CO_2$, $O_2$, $N_2$ and $CH_4$ permeabilities. Low gas flux values were observed for He and $H_2$ yielding abnormally high apparent skin thicknesses. As a result, the permeance of these gases was thought to be largely limited by the caulking layer and, therefore, apparent skin thickness values derived therefrom expected to be unreliable.

EXAMPLE 4

Gas Permeability of ISAMs Prepared from >20% w/w Low-Molecular Weight (64,000<$M_w$≦100,000) Polyaniline EB Solutions:

EB polyaniline was synthesized at approximately 0° C. To a solution of 3.166 g of NMP and 150 mg of 3,3-dimethylpiperidine, 911 mg of (NESTE) EB was added, the mixture was stirred for several minutes and placed in an oven at 60° C. for approximately 20 min. until a homogeneous solution was formed. The mass content of EB in this solution was ~21.6% w/w. The solution was spread onto a glass plate and the wet film was drawn by setting the draw down blade to 0.006. It was then immersed in water 15° C., where it was kept for 24 h. The film was air dried for several hours before it was placed in a vacuum oven overnight. A 100% silicon elastomer caulking layer was applied to the membrane surface and allowed to dry overnight before the film was placed inside a test cell at 27° C. to measure the gas permeation properties. The results of these measurements are shown in TABLE 4.

EXAMPLE 5

Bifunctional Groups (Combined Amide and Amine Structures in a Single Molecule) Used as Gel Inhibitors:

To a solution of 3.074 g of NMP and 302 mg of N,N-Diethylnipecotinamide, 894 mg of (NESTE) EB was added, the mixture stirred for several minutes and then placed an oven at 60° C. for approximately 45 min. The resulting solution was found to be viscous. The mass content of polyaniline EB in the solution was ~20.9% w/w. The solution was spread onto a glass plate and the wet film was drawn by setting the draw down blade at 0.006 in. It was then immersed in water at 15° C. where it was kept for 24 h. The film was then dried for several hours and placed overnight in a vacuum oven. A 100% silicon elastomer caulking layer was applied to the membrane surface and dried overnight before being placed in the test cell at 27° C. to measure the gas permeation properties. The results are shown in TABLE 5.

The results of EXAMPLES 1-5 hereof indicate that polyaniline EB having various molecular weights and different commercial sources can be used for fabricating Integrally Skinned Asymmetric Membrane (ISAMs) suitable for gas separations. Primary, secondary and tertiary amines were used as gel inhibitors to process concentrated polyaniline solutions enabling fabrication of these membranes.

EXAMPLE 6

Gas Permeability of ISAMs Prepared from 20% w/w Polyaniline EB/Solvent Solutions Without the Use of Gel Inhibitors:

To a solution of 2.873 g of NMP, 680 mg of NESTE Oy polyaniline EB powder was added in less than 5 seconds. The mixture was vigorously stirred for several minutes. The mass content of polyaniline EB in this solution was ~19.1% w/w. The solution was found to have a gelation time less than 10 min. at room temperature, and heating the solution in an oven at 60° C. caused instantaneous gelation. Prior to gelation, the solution was poured onto a glass plate and the wet film was drawn by setting the draw down blade to 0.006 in. The wet film was immersed in water at 17° C. and kept there for 24 h. The film was air dried for several hours and placed overnight in a vacuum. A 100% silicon elastomer caulking layer was applied to the membrane surface and dried overnight before the film was placed inside the test cell at 27° C. to measure the gas permeation properties. The results are shown in TABLE 6. Two solvents were used to prepared 20% w/w polyaniline EB/solvent IP films. The observed gas permeance indicates that IP films prepared from polyaniline EB/NMP solutions exhibit no selectivity for any of the tested gas pairs. IP films prepared from polyaniline EB/TMU solutions, however, were observed to have a selectivity of 2.4 for the $O_2/N_2$ gas pair. This is likely due to the selectivity of the silicon elastomer caulking layer and not the selectivity generated by the polyaniline EB dense skin, since no selectivity was observed for $H_2/N_2$ and $CO_2/CH_4$. The polyaniline EB/solvent solution generally appeared to be pasty which is indicative of an inhomogeneous solution.

EXAMPLE 7

Gas Permeation Properties of ISAM Prepared from 20% w/w Polyaniline EB in Different Solvents Using Heptamethyleneimine as Gel Inhibitor:

To a solution of 3.155 g of 1,3-dimethyl-3,4,5,6-2(1H) tetrahydropyrimidinone and 0.309 g of heptamethyleneimine, 0.885 g of NESTE Oy EB polyaniline was added, the mixture was stirred for several minutes and placed in an oven at 60° C. for approximately 10 min. The heated mixture was again stirred until a homogeneous solution was formed. The solution was then poured onto a glass slide and draw down blade (Gardner blade) set to 0.006 in. Once the wet film was drawn, it was immersed in a water bath at 17° C. where it kept for 48 h. The film was then air dried for 24 h and placed in a vacuum oven for 24 hours. A 100% silicon elastomer was used to caulk the membrane surface which was then air dried overnight until the elastomer solidified. The membrane was loaded in the test cell at 27° C. to measure the gas permeation properties. The results are shown in TABLE 7. It is important to note that the above procedure is not the optimum procedure for process polyaniline EB ISAM membranes. As was shown hereinabove, the membranes should be heated at 120° C. for 2 h to produce optimum permeation properties.

EXAMPLE 7 demonstrates that preparing the 20% w/w EB polyaniline solutions with different solvents permits the formation of ISAMs having different gas permeation properties. TABLE 7 is arranged such that the order $O_2/N_2$ selectivity goes from the highest to the lowest. The permeance of the $O_2$, $N_2$, $CO_2$, and $CH_4$ follows the inverse of the general trend observed for the permeance of the $O_2/N_2$ and $CO_2/CH_4$. The selectivity of the $O_2/N_2$ gas pairs varies from 8 to 4, and that for $N_2$ changes from 1611 to 10697. Oxygen permeance changes from 12717 to 43362, while $CH_4$ permeance changes from 1410 to 21876 and $CO_2$ permeance changes from 70021 to 241424.

For some of the membranes described in TABLE 7, the permeance either He or $H_2$ appears to be lower in relationship with the permeance of $CO_2$. Possible explanations include: (a) Since the flux of the polyaniline EB membrane for these gases is significantly higher, the caulking layer may have limited the diffusion of the He and $H_2$, and (b) The membrane was not heat treated, not extracted using methanol and, therefore, may have slight NMP and GI residues which might influence the permeation properties of the membrane.

The $O_2/N_2$ separation factor of the membrane is not likely to be affected by the caulking layer since the permeance of the $N_2$ and $O_2$ of the polyaniline EB membrane are both within the range that the high flux silicon elastomer can provide. In addition, the $CO_2$ permeability of the caulking layer is so high that the thick caulking layer does not affect the measurements. Known permeabilities of the silicone caulking layer are: He, 76.74; $H_2$, 128.74; $CO_2$, 639.71; $O_2$, 127.73; $N_2$, 61.3; and $CH_4$ 202.94. It is also possible that the various films have different skin thickness as different solvents were used, or the surface porosity of the membranes are different from one another. Calculations of the skin thicknesses based on the $N_2$ and $O_2$ yield values from 0.18 μm to approximately 0.038 μm.

EXAMPLE 8

Effect of GI/EB Molar Ratio on the Permeation Properties of Polyaniline ISAMs:

The EB/NMP/HPMI films were prepared using NESTE Oy EB powder. The GI/EB molar ratio is about twice that for the previous EXAMPLES. That is, EB=0.890 g, HPMI=0.596 g, NMP=3.15 g, EB polyaniline mass content of 19.2% w/w, and the GI/EB=0.00527/0.00246=2.14, for the first film while EB=1.790 g, HPMI=0.593 g, NMP=6.237 g, yielding a polyaniline EB mass content of 20.8% w/w, and the GI/EB=0.00527/0.00494=1.07. At 27° C., the results for gas permeance for the various gases is listed in TABLE 8. It is observed that there is little effect on the permeation properties of the polyaniline ISAM films when the GI/EB molar ratio is varied from 1.07 to 2.14 in the solution. However, higher GI/EB molar ratios generally result in longer gelation times and lower solution viscosities.

EXAMPLE 9

Effect of Polyaniline EB Mass Content in Solution on the Gas Permeation Properties of ISAMs:

ISAMs have been prepared from 20% w/w and 25% w/w concentrations of polyaniline EB in NMP/HPMI solutions. In the first, 1.774 g of NESTE EB powder ($4.90 \times 10^{-3}$ moles) was added to a solution of 6.191 g of NMP and 0.589 g of heptamethyleneimine ($5.21 \times 10^{-3}$ moles) to generate a 20.74% w/w EB polyaniline solution in NMP/HPMI having a GI/EB molar ratio of 1.06. After vigorously stirring the mixture for 1 min., it was heated in an oven at 60° C. Every 5 min., the solution was removed from the oven and again stirred. This procedure was repeated at least 6 times until a flowable, homogeneous liquid was formed. The solution was poured onto a glass plate and a wet film drawn with the Gardner blade set at 0.006 in. The membrane was then immersed into water at 18° C. for 24 h. The films were then dried using paper towels to remove the excess water, air dried for several hours and placed in a vacuum oven for greater than 48 h at $10^{-2}$ Torr to remove residual moisture.

In the second procedure, 2.50 g of NESTE EB powder ($6.91 \times 10^{-3}$ mole) was added to a solution of 6.300 g of NMP and 1.203 g of heptamethyleneimine ($1.06 \times 10^{-2}$ moles) to make a 25.00% w/w polyaniline EB solution in NMP/HPMI having a (GI/EB molar ratio of 1.53. The mixture was vigorously stirred for 1 min. to ensure the powder was sufficiently wet, and then heated in an oven at 60° C. Every 10 min. the solution was removed from the oven and again stirred. This procedure was repeated 5 times after which it was observed that the solution viscosity was lower than the viscosity of the starting mixture. The solution was then poured onto a glass plate and the Gardner blade set at 0.005 in. The drawn wet film was immersed into a water bath at 18° C. for 24 hours. The IP films were then dried using paper towels to remove the excess water, air dried for several hours and placed in a vacuum oven to pump for greater than 48 hours at $10_{-2}$ Torr to remove residual moisture. The films were then tested at 27° C. for their gas permeance characteristics. The results are set forth in TABLE 9 hereof. The IP film having 25% w/w EB/NMP/HPMI was found to have a smaller permeance when compared to the IP film prepared with 20% w/w, while the selectivity for $O_2/N_2$ and $H_2/N_2$ for the 25% w/w EB/NMP/HPMI film was observed to be better than that for the with 20% w/w.

EXAMPLE 10

Effect of Post Treatment on the Gas Permeation Properties of Polyaniline EB ISAMs:

Post membrane treatment of polyaniline EB ISAMs have significant impact on the final gas permeation properties of the membrane. Comparison is made between the as-cast membrane, the as-cast membrane thermally treated at 120° C. for 2 h, the as-cast membrane immersed in methanol for 48 h, the as-cast membrane immersed in methanol for 48 h and subsequently thermally treated at 120° C. for 2 h, and the as-cast membrane immersed in methanol for 48 h followed by thermal curing at 120° C. for 2 h. All membranes were later caulked with silicon elastomer and left to air dry overnight and then loaded in the test cell at 27° C. for the measurement of gas permeation properties. The results are set forth in TABLE 10 hereof. All samples were taken from the same membrane and the procedure for preparing the as-cast membrane is described hereinabove. From these results, the two most favorable method for processing are: (1) treating the as-cast film in an oven at 120° for 2 h followed by caulking the film with silicon elastomer; or (2) extracting the film with methanol and thermally curing the film. It should be mentioned at this point that 4 independent repetitions of these procedures were carried out whereby polyaniline EB ISAMs from 20% w/w EB solution were prepared. The permeability results for $O_2$, $N_2$, $CO_2$ and $CH_4$ were found to be reproducible. Slight variations in the gas permeance for He and $H_2$ were observed, however. Perhaps, this reflects differences in the thickness of the caulking layer that was applied to the membranes.

EXAMPLE 11

Effect of Temperature on the Permeation Properties of the EB ISAMS:

Gas permeation properties of the EB ISAMs were measured at 24° C. and 28° C. for a membrane prepared from 25% w/w EB/NMP/HPMI solution in accordance with the procedure described hereinabove. The results are set forth in TABLE 11, hereof. It was observed that the gas permeance is higher at higher temperature when compared with that for lower temperature, while the selectivity for $O_2/N_2$ and $CO_2/CH_4$ improves as the temperature decreases.

EXAMPLE 12

Effect of the Caulking Layer on the Gas Permeation Properties of Polyaniline EB ISAMs:

The ISAM employed was prepared from a 20% EB/NMP/Heptamethyleneimine solution. The polyaniline EB powder was purchased from NESTE Oy. The thickness of the membrane was not determined and the diameter of the film was 1 in. The draw down blade was set at 0.006 in. After the film was drawn, it was immersed into water at 15° C. for 24 h. The film was then placed in a vacuum for 24 h and subsequently heated in an oven at 120° C. for 2 h. After cooling to room temperature, the film was immersed in methanol for 48 h, placed under vacuum for 48 h, and a 1% silicon elastomer was applied to the skin surface. The film was placed in a vacuum for another 24 h before it was loaded in the test cell at 25° C. After the measurement of the gas permeability of this IP film, a second coating 1% of silicon elastomer in cyclohexane solution was applied, the film placed under vacuum for 24 h and the gas permeability remeasured. The same film was again caulked with layer of 5% silicon elastomer in cyclohexane solution, placed in a vacuum 24 h and the gas permeability tested. The results are shown in TABLE 12 hereof.

The increase in selectivity as different coatings are applied to the skin surface is clear. Although the exact coating thickness was not carefully measured, the selectivity of the gas pairs is increased to where it is similar to that for the dense film.

The permeance of the film also decreases as the thickness of the coating layer increases. The gas permeance for He and $H_2$ decreases little after a thin layer of the silicon elastomer coating was applied to the skin surface; however, the permeance for $O_2$, $N_2$, $CO_2$ and $CH_4$ drops more significantly than that for the faster gases. The estimated average thickness of the skin layer is approximately 0.27 µm. From the data, it may be observed that the best caulking method is to apply a first layer by painting a 1% silicon elastomer in cyclohexane solution on the polyaniline EB membrane, followed by a second layer over the first layer by painting a 5% silicon elastomer in cyclohexane solution on the caulked membrane.

EXAMPLE 13

Effect of Heat Treatment on the Gas Permeation Properties of the Polyaniline EB ISAMs:

To a solution of 3.155 g 1,3-Dimethyl,3,4,5,6-tetrahydro-2(H)-pyrimidinone and 0.309 g of heptamethyleneimine ($2.73 \times 10^{-3}$ moles), 0.885 g of NESTE EB powder ($2.44 \times 10^{-3}$ moles) was added to generate a 20.3% w/w EB/1,3-Dimethyl, 3,4,5,6-tetrahydro-2(H)-pyrimidinone/HPMI solution having a GI/EB molar ratio of 1.12. After vigorously stirring the mixture for 1 min. the mixture was placed inside an oven at 58° C. for 7 min. which resulted in homogeneous solution. The solution was poured onto a glass plate and the Gardner blade set to 0.006 in. Once the wet film was drawn, it was immersed into a water bath at 18° C. for 24 h. The film was dried using paper towels to remove the excess water, air dried for several hours and placed in a vacuum oven for greater than 48 h at $10^{-2}$ Torr to ensure that residual moisture was removed. This membrane was later heat treated at various temperature by placing it in an oven under a flow of Ar gas. The membrane surface was then caulked with 100% silicon elastomer before being loaded in the test cell at 30° C. for measurement of its gas permeation properties. The results are set forth in TABLE 13 hereof. The membrane heat treated at temperatures below 150° C. shows slight improvement in the selectivities of all gas pairs and a slight decrease in gas permeance for most gases ($CO_2$, $O_2$, $N_2$, and $CH_4$). The membrane heat treated at 200° C. for 2 h shows a dramatic decrease on gas permeance for all gases. This is likely due to the formation of a more rigid polymer backbone structure induced by thermal crosslinking between the polymer chains.

EXAMPLE 14

Effect of Acid Doping on the Gas Permeation Properties of Polyaniline EB ISAMs:

Measurements were obtained from 1.3 in. diameter polyaniline EB membranes dissected from the same larger membrane in order to eliminate the discrepancies arising from separate sample preparations. Membrane doping is achieved by immersing the membranes in two liters of aqueous acid solution at 25° C. for 48 h. The membranes were then air dried for several hours before being placed in a vacuum oven for 48 h to remove residual moisture. The membrane surface was subsequently caulked with 100% silicon elastomer before being loaded in the test cell at 22° C. where the gas permeation properties were measured. The results are set forth in TABLE 14 hereof.

Five months later, the 0.010 M HCl-doped ISAM was retested. The results are set forth in TABLE 15 hereof. Doping the IP film with different concentration of HCl aqueous solution are shown to alter the permeation properties of the ISAMs. Higher doping levels give the lowest gas permeance.

The as cast membranes are observed to have the highest gas permeance, while the partially doped samples have intermediate permeance.

Light doping of the polyaniline EB ISAMs gives higher $CO_2/CH_4$ selectivity (63) as compared to the selectivity of the as-cast membranes (49.8). However, the higher selectivity was achieved by sacrificing the overall gas permeance of the membrane.

Still 5 months later, the 0.010 M HCl-doped EB ISAM was retested at higher temperature (30° C.). The permeance for He, $H_2$, $O_2$ and $CO_2$ were essentially the same; however, the permeances for slower gases $N_2$ and $CH_4$ are different and increased 50% and 100%, respectively, as compared to the first measurements. The selectivity for $O_2/N_2$ is still as high as 10.9 and that for $H_2/N_2$ is 851.

A series of studies using HBr as the dopant was also performed for polyaniline EB ISAMs. The results are set forth in TABLE 16 hereof. Doping the IP film with different concentrations of HBr in aqueous solution can alter the permeation properties of ISAMs. It is clear that higher doping levels give the lowest gas permeance. The as cast membranes have the highest gas permeance, while the partially doped samples have intermediate permeance. It was also observed that $O_2/N_2$ selectivity increases when the EB membrane was doped using 0.010 M HBr in aqueous solution. The gas permeance was observed to drop by one order of magnitude, while selectivity of $O_2/N_2$ increase from 7.6 to 10.5.

Investigation of trifluoroacitic acid as a dopant for polyaniline EB ISAMs was also performed. The results are set forth in TABLE 17 hereof. It was found that the permeance of the membrane decreased slightly when the EB membrane was doped using 0.010 M $CF_3COOH$. As the concentration of the trifluoroacetic acid was increased, the gas permeance of the doped EB membrane was also found to increase. Selectivity for $O_2/N_2$ remained unchanged, while selectivity for $CO_2/CH_4$ increased from 38.87 (as cast) to 52.21.

EXAMPLE 15

Effect of Dopant Size on the Fully Doped Polyaniline EB ISAMs:

TABLE 18 sets forth the gas permeation properties for fully doped polyaniline EB ISAMs for various dopants. These dopants include organic and inorganic acids which have been listed in the order of their sizes from small to large. Fully doped polyaniline EB ISAMs show a decrease in gas permeance when compared to the as cast polyaniline EB ISAMs with the exception of trifluoroacetic acid ($CF_3COOH$) where the gas permeance for all gases increases slightly as the EB ISAM was fully doped by this acid. HCl and HBr-fully doped polyaniline EB ISAMs have an $H_2/N_2$ selectivity of greater than 720 and an $O_2/N_2$ selectivity of greater than 9.2. $CF_3COOH$-doped polyaniline EB ISAMs exhibit a $CO_2/CH_4$ selectivity of 52.2 and a gas permeance of 53462 ($10^{-10}$ cc STP/cm$^2$ s cm Hg). There appears to be no general trend relating the dopant size to the permeance of the EB membrane.

EXAMPLE 16

Gas Separation ISAMs Prepared from Polyaniline EB and Polysulfone (PS) Blends:

To a solution of 3.010 g of NMP and 0.308 g HPMI ($2.72 \times 10^{-3}$ moles), 0.893 g ($2.47 \times 10^{-3}$ moles) of NESTE (EB) powder was added to make a 21.2% w/w EB/NMP/HPMI mixture having a GI/EB molar ratio of 1.10. After vigorously stirring the mixture for 1 min., the mixture was placed in an oven at 58° C. for 30 min. which resulted in a homogeneous solution. In a separate vial, 2.0 g of polysulfone, (Udel Amoco PS, P-3500NT-11) was added to 8.0 g of NMP solvent to generate a 20% w/w PS solution which was placed inside the oven at 580 until the PS completely dissolved in the NMP solvent. After both solutions were cooled to room temperature (22° C.), 1.0 g of the PS solution was added to 4.0 g of EB solution, stirred for one min. and placed in the oven at 58° C. for 5 min. to obtain a homogeneous solution. This solution was poured on a glass plate and the Gardner blade set to 0.006 in. Once the wet film was drawn, it was immersed in a water bath at 18° C. for 24 h. The IP film was dried using paper towels to remove excess water, air dried for several hours and placed in a vacuum oven for greater than 48 h at $10^{-2}$ Torr to ensure removal of residue moisture. The final composition of this membrane contained 80% w/w polyaniline EB and 20% w/w of PS. This membrane was caulked with 100% silicon elastomer and placed in the test cell at 30° C. where its gas permeation properties were measured.

For another blend, 0.878 g ($2.43 \times 10^{-3}$ moles) of NESTE (EB) powder was added to 2.995 g tetramethylurea (TMU) and 0.308 HPMI ($2.72 \times 10^{-3}$ moles) solution to make a 21.0% w/w EB/TMU/HPMI mixture having a GI/EB molar ratio of 1.12. After vigorously stirring the mixture for 1 min., the mixture was placed in an oven at 58° C. for 30 min. which resulted in an homogeneous solution. In a separate vial, 2.0 g of PS (Udel Amoco PS, P-3500NT-11) was added to 8.0 g of TMU solvent to generate a 20% w/w PS solution which was placed in the 58° C. oven until the PS completely dissolved in the TMU. After both solutions were cooled to room temperature (22° C.), 1.0 g of PS solution was added to 4.0 g of EB solution, stirred for 1 min. and placed in the 58° C. oven for 5 min. to obtain an homogeneous solution. This solution was poured on a glass plate and the Gardner blade set to 0.006 in. Once the wet film was drawn, it was immersed in water bath at 18° C. water bath for 24 hours. The IP film was dried using paper towels to remove the excess water, air dried for several hours and placed in a vacuum oven for greater than 48 h at $10^{-2}$ Torr to remove residual. The final composition of this membrane contained 80% w/w of polyaniline EB and 20% w/w of PS. The membrane was caulked with 100% silicon elastomer and loaded in the test cell at 30° C. where its gas permeation properties were measured. The results are set forth in TABLE 19 hereof.

ISAMs prepared from the above-described EB and PS blend solutions exhibited good $O_2$ and $N_2$ gas permeance and $O_2/N_2$ selectivities of 6.33 and 5.13, respectively.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

TABLE 1

| Gel-Inhibitor EB mass content | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| 2,5-Dimethyl-3-Pyrroline (15.8%) | 69526 | 103876 | 1778 | 12566 | 62938 | 1474 | 58.4 | 7.07 | 42.70 |
| N-ethylbenzylamine (15.6%) | 76834 | 119483 | 2443 | 14964 | 71083 | 2501 | 48.9 | 6.13 | 28.4 |
| Piperazine (15.9%) | 49017 | 73541 | 934 | 7167 | 33969 | 944 | 78.7 | 7.67 | 36.0 |
| 2,6-Dimethylmorpholine (16.1%) | 54890 Micron | 87131 | 2994 | 17784 | 66355 | 2944 | 29.1 | 5.94 | 22.5 |

TABLE 1-continued

| Gel-Inhibitor EB mass content | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Piperidine (15.3%) | 53570 | 77485 | 7389 | 926 | 28743 | 885 | 83.7 | 7.98 | 32.48 |
| Dibutylamine (21.6%) | 44812 | 63013 | 1272 | 7802 | 34240 | 2183 | 49.5 | 6.00 | 15.7 |
| Hexamethyleneimine (21.7%) | 37890 | 48533 | 2431 | 414 | 8800 | 1015 | 117.0 | 5.87 | 8.67 |
| Mixture of Thiomorpholine (0.390 g) and 2-Methylaziridine (0.290 g) (20.3%) | 43892 | 55397 | 3435 | 487 | 14195 | 778 | 113.66 | 7.05 | 18-19 |

TABLE 2

| Gel-Inhibitor EB mass content | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Heptamethyleneimine 20.8% | 72953 | 10627 | 1528 | 10627 | 36861 | 1125 | 69.6 | 6.96 | 32.8 |

TABLE 3

| Gel-Inhibitor EB Mass Content | He | $H_2$ | $N_2$ | $O_2$ | $CO_2$ | $CH_4$ | Average Skin Thickness | $H_2/N_2$ | $O_2/N_2$ | $CO_2/CH_4$ |
|---|---|---|---|---|---|---|---|---|---|---|
| n-Butylamine 19.8% | 77114 | 120737 | 2646 | 18276 | 96398 | 2701 | 0.088 μm | 46 | 6.90 | 35.7 |
| Triethylamine 17.5% | 61545 | 98837 | 2601 | 18039 | 81233 | 1962 | 0.098 μm | 38 | 6.94 | 41.4 |
| 3,3-Dimethylpiperidine 21.6% | 75914 | 114646 | 1969 | 14676 | 60018 | 1730 | 0.125 μm | 58 | 7.45 | 34.7 |
| Heptamethylene-imine 20.1% | 66418 | 96976 | 1290 | 9843 | 42215 | 1086 | 0.188 μm | 75 | 7.60 | 38.9 |
| Diisopropylamine 20.4% | 58078 | 68537 | 416 | 3724 | 14414 | 356 | 0.547 μm | 165 | 8.95 | 40.5 |

TABLE 4

| Gel-Inhibitor | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| N-Methylpiperidine | 44606 | 69070 | 1123 | 6736 | 32797 | 1344 | 61.5 | 6.00 | 24.4 |
| N,N'-Dirnethylpiperazine | 16211 | 20652 | 313 | 1651 | 6881 | 364 | 65.98 | 5.27 | 18.90 |

TABLE 5

| Gel-Inhibitor | He | $H_2$ | $N_2$ | $O_2$ | $CO_2$ | $CH_4$ | Average Skin Thickness | $H_2/N_2$ | $O_2/N_2$ | $CO_2/CH_4$ |
|---|---|---|---|---|---|---|---|---|---|---|
| Diethylnipecotinamide | 46092 | 59010 | 926 | 5534 | 17396 | 905 | 0.327 μm | 64 | 5.98 | 19.2 |

TABLE 6

| Sample | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| IP film from 19.1% w/w EB/NMP Solution | 368894 | 546117 | 127849 | 122975 | 196310 | 153308 | 4.27 | 0.96 | 1.28 |
| IP film from 20% w/w EB/tetramethylurea Solution | 66825 | 111515 | 28884 | 70233 | 408549 | 84461 | 1.67 | 2.43 | 4.84 |

TABLE 6-continued

| Sample | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeability of the 0.5 μm caulking layer (Silicon elastomer) | 76.74 | 128.74 | 61.3 | 127.73 | 639.71 | 202.94 | 1.68 | 2.08 | 3.15 |

TABLE 7

| Solvent | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| 1,3-Dimethyl-3,4,5,6-tetrahydro-2(1H)-pyrimidinone | 67644 | 108036 | 1611 | 12717 | 70021 | 1410 | 67 | 7.89 | 49.7 |
| n-Methyl-2-Pyrrolidinone (NMP) | 66418 | 96976 | 1290 | 9843 | 42215 | 1086 | 75 | 7.60 | 38.9 |
| n-Methylcaprolactam | 109240 | 161274 | 3096 | 18769 | 92850 | 5192 | 52 | 6.06 | 17.9 |
| Dimethylacetamide | 101753 | 154800 | 5415 | 31078 | 141172 | 7494 | 29 | 5.74 | 18.8 |
| Tetramethylurea | 62052 | 104343 | 5182 | 26559 | 132474 | 7555 | 20 | 5.13 | 17.5 |
| Dimethylpropioamide | 63243 | 110520 | 10697 | 43362 | 241424 | 21876 | 10 | 4.05 | 11.0 |

TABLE 8

|  | He | H2 | N2 | O2 | CO2 | CH4 | H2/N2 | O2/N2 | CO2/CH4 |
|---|---|---|---|---|---|---|---|---|---|
| Permeance of as-cast Asymmetric membrane GI/EB = 2.14 | 66418 | 96976 | 1290 | 9843 | 42215 | 1086 | 75.2 | 7.63 | 38.9 |
| Permeance of as-cast Asymmetric membrane GI/EB = 1.07 | 81068 | 106767 | 1235 | 9372 | 37558 | 1258 | 86.5 | 7.59 | 29.9 |

TABLE 9

|  | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of the as-cast asymmetric membrane from 20.7% w/w solution | 715470.60 micron | 1043170.42 | 10680.15 | 92330.16 | 447320.16 | 8990.086 | 98 | 8.6 | 49.8 |
| Permeance of the as-cast asymmetric membrane from 25.0% w/w solution | 820390.60 micron | 1034580.43 | 6900.25 | 58610.26 | 264360.27 | 5840.13 | 150 | 8.49 | 45.3 |

TABLE 10

|  | He | $H_2$ | $N_2$ | $O_2$ | $CO_2$ | $CH_4$ | Average thickness | $H_2/N_2$ | $O_2/N_2$ | $CO_2/CH_4$ |
|---|---|---|---|---|---|---|---|---|---|---|
| Permeance of the as-cast asymmetric Membrane | 66418 | 96976 | 1290 | 9843 | 422150 | 1086 | 0.27 μm | 75 | 7.6 | 38.9 |
| Permeance of as-cast Thermally cured at 120° C. | 134749 | 171388 | 1156 | 9670 | 35736 | 768 | 0.20 μm | 148 | 8.4 | 46.5 |
| Permeance of as-cast Methanol treated | 107924 | 146358 | 1370 | 10262 | 40291 | 1124 | 0.20 μm | 107 | 7.5 | 35.9 |
| Permeance of as-cast Methanol treated then Thermally cured at 120° C. | 105024 | 125861 | 795 | 6842 | 24814 | 610 | 0.27 μm | 158, | 8.6 | 40.7 |
| Permeance of as-cast Thermally cured at 120° C., then Methanol treated | 87821 | 138618 | 1749 | 13884 | 59558 | 1460 | 0.20 μm | 79 | 7.9 | 40.8 |

TABLE 11

| | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of the as cast asymmetric membrane at 28° C. | 82039 | 103458 | 690 | 5861 | 26436 | 584 | 150 | 8.49 | 45.3 |
| Permeance of the As-cast asymmetric membrane at 24° C. | 79296 | 96313 | 647 | 5664 | 24372 | 506 | 149 | 8.75 | 48.2 |

TABLE 12

| | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance Dense membrane | 713.5 | 710.4 | 2.46 | 26.0 | 119.6 | 1.40 | 290 | 10.6 | 86 |
| Permeance of As-cast asymmetric membrane (uncaulked) | 604810 | 807535 | 155267 | 149310 | 154955 | 217420 | 3.9 | 0.96 | 0.71 |
| Permeance of asymmetric membrane (caulked with 1% silicon elastomer) | 199478 | 176441 | 2772 | 8233 | 28131 | 3397 | 72 | 3.0 | 8.3 |
| Permeance of asymmetric membrane (caulked with 1% silicon elastomer and then 5% silicon Elastomer) | 159642 | 145209 | 481 | 4362 | 17536 | 348 | 331 | 9.1 | 50.4 |
| Ratio of permeance of IP film/Dense film | 224 | 204 | 196 | 168 | 147 | 249 | | | |
| Estimated film Thickness (microns) | 0.25 | 0.27 | 0.29 | 0.33 | 0.38 | 0.23 | | | |

TABLE 13

| Sample | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| As cast | 67644 | 108036 | 1611 | 12717 | 70021 | 1410 | 67 | 7.89 | 50 |
| As cast film heat treated at 150° C. for 4 h | 84820 | 126780 | 1435 | 11719 | 49643 | 965 | 88 | 8.17 | 51 |
| As-cast film heat treated at 200° C. for 2 h | 42150 | 56791 | 428 | 3509 | 15118 | 310 | 132 | 8.20 | 49 |
| As-cast film heat treated at 250° C. for 25 min. | 33565 | 42743 | 466 | 3694 | 16983 | 362 | 92 | 7.67 | 47 |

TABLE 14

| | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of asymmetric membrane as cast | 71546 | 104317 | 1068 | 9233 | 44732 | 899 | 98 | 8.6 | 49.8 |
| Permeance of asymmetric membrane 0.00100 M HCl doped | 38579 | 52718 | 209 | 2338 | 9132 | 146 | 252 | 11.2 | 62.5 |

TABLE 14-continued

|  | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of asymmetric membrane 0.0050 M HCl doped | 55569 | 54713 | 77 | 877 | 3389 | 64.6 | 710 | 11.4 | 52.5 |
| Permeance of asymmetric membrane 0.0100 M HCl doped | 39755 | 44242 | 53.3 | 796 | 2980 | 47.3 | 830 | 15.0 | 63 |
| Permeance of asymmetric membrane 0.0175 M HO doped Average #1 & #2 measurements | 44683 | 38873 | 35.8 | 497 | 1877 | 45.6 | 1087 | 14.1 | 41.5 |
| Permeance of asymmetric membrane 4 M HCl doped | 18760 | 15248 | 21.5 | 195 | 750 | 48 | 709 | 9.1 | 15.6 |

TABLE 15

|  | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of asymmetric membrane doped-dedoped-redope by 0.01 M HCL operating temperature 30° C. | 39570 | 31703 | 22.7 | 350 | 1202 | 30 | 1397 | 15.4 | 40 |
| 5 months later Retest the same film Operating temperature 30° C. | 42047 | 31049 | 36.5 | 396.4 | 1266 | 58.9 | 851 | 10.9 | 21.5 |

TABLE 16

|  | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of the as cast asymmetric Membrane | 66418 | 96976 | 1290 | 9843 | 42215 | 1086 | 75.2 | 7.63 | 38.87 |
| Permeance of 0.010 M HBr doped Asymmetric Membrane | 34020 | 33073 | 102.3 | 1.072 | 4234 | 1.09 | 332.6 | 10.48 | 38.84 |
| Permeance of 0.100 M HBr doped Asymmetric Membrane | 19409 | 21297 | 46.3 | 335 | 1344 | 73.7 | 460.0 | 7.30 | 18.23 |
| Permeance of 4 M HBr doped Asymmetric Membrane | 16415 | 14288 | 19.0 | 194 | 709 | 27.6 | 751.2 | 10.23 | 25.69 |

TABLE 17

|  | He | $H_2$ | $N_2$ | $O_2$ | $CO_2$ | $CH_4$ | $H_2/N_2$ | $O2/N2$ | $CO_2/CH_4$ |
|---|---|---|---|---|---|---|---|---|---|
| Permeance of the As-cast asymmetric Membrane | 66418 | 96976 | 1290 | 9843 | 42215 | 1086 | 75.2 | 7.63 | 38.87 |
| Permeance of 0.010 M $CF_3COOH$ Doped asymmetric Membrane | 87705 | 98847 | 829 | 6533 | 23210 | 518 | 119.2 | 7.88 | 44.80 |
| Permeance of 0.0175 M $CF_3COOH$ Doped asymmetric Membrane | 119083 | 120188 | 1015 | 7399 | 25788 | 634 | 118.4 | 7.29 | 40.68 |

TABLE 17-continued

| | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of 1.0 M $CF_3COOH$ Doped asymmetric Membrane | 66662 | 81494 | 1380 | 9931 | 53462 | 1024 | 59.1 | 7.20 | 52.21 |

TABLE 18

| Dopant | Size, Å | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|---|
| As cast | 0.00 | 71547 | 104320 | 1068.0 | 9233.0 | 44732 | 899.0 | 97.6 | 8.65 | 49.76 |
| HF | 9.8500 | 9036 | 7744 | 23.6 | 167.0 | 576 | 47.0 | 328.1 | 7.08 | 12.26 |
| HCl | 28.840 | 18760 | 15248 | 21.0 | 195.0 | 750 | 48.0 | 726.1 | 9.29 | 15.63 |
| HBr | 31.060 | 16415 | 14288 | 19.0 | 194.4 | 709 | 27.6 | 751.2 | 10.22 | 25.69 |
| HCOOH | 54.050 | 12480 | 9104 | 30.4 | 154.7 | 705 | 67.0 | 299.5 | 5.09 | 10.52 |
| $CH_3COOH$ | 77.640 | 18534 | 14147 | 41.4 | 303.6 | 2188 | 117.0 | 341.6 | 7.33 | 18.70 |
| $CF_3COOH$ | 87.020 | 66662 | 81494 | 1380.0 | 9931.0 | 53462 | 1024.0 | 59.1 | 7.20 | 52.21 |
| $ClCH_2COOH$ | 99.550 | 4658 | 2992 | 16.7 | 80.0 | 464 | 46.4 | 179.2 | 4.79 | 10.00 |
| $Cl_2CHCOOH$ | 121.40 | 7208 | 5391 | 33.0 | 253.0 | 1397 | 54.400 | 163.4 | 7.67 | 25.68 |
| $CCl_3COOH$ | 143.50 | 14910 | 10233 | 78.0 | 733.0 | 3775.0 | 154.00 | 131.2 | 9.40 | 24.51 |

TABLE 19

| | He | $H_2$ | $N_2$ | $O_2$ | $CO_2$ | $CH_4$ | $H_2/N_2$ | $O_2/N_2$ | $CO_2/CH_4$ |
|---|---|---|---|---|---|---|---|---|---|
| Permeance of the as-cast EB/PS Asymmetric Membrane from NMP solution | 60030 | 92737 | 2614 | 16538 | 79977 | 2785 | 35.5 | 6.33 | 28.7 |
| Permeance of the as-cast EB/PS Asymmetric Membrane from TMU solution | 62052 | 104340 | 5182 | 26559 | 132474 | 7555 | 20.1 | 5.13 | 17.5 |

What is claimed is:

1. A method for preparing an integrally skinned, gas permeable asymmetric hollow fiber which comprises the steps of:
   (a) forming a solution of the emeraldine base (EB) form of polyaniline having between 15% and 30% w/w of polyaniline;
   (b) adding a gel inhibitor to the solution;
   (c) extruding the solution through the outer bore of a hollow fiber spinnerrette nozzle;
   (d) passing the solution through an air-gap; and
   (e) directing the extruded solution into a coagulation bath containing a nonsolvent for polyaniline, whereby an asymmetric hollow fiber having a permeable dense skin in the vicinity of the surfaces thereof in contact with the nonsolvent and a lower-density porous interior support portion is formed.

2. The method as described in claim 1, wherein the EB form of polyaniline comprises high-molecular weight polyaniline.

3. The method as described in claim 2, wherein the nonsolvent for polyaniline comprises water.

4. The method as described in claim 1, wherein the gel inhibitor is selected from the group consisting of primary, secondary and tertiary amines.

5. The method as described in claim 1, further including the step of drying the hollow fiber after said step of directing the extruded solution into a coagulation bath.

6. The method as described in claim 1, further including the step of caulking the dense skin after said step of directing the extruded solution into a coagulation bath.

7. The method as described in claim 6, wherein the caulking compound comprises silicon elastomer.

8. The method as described in claim 7, wherein the silicon elastomer comprises polydimethylsiloxane.

9. The method as described in claim 1, further comprising the step of heating the hollow fiber for a chosen period in order to improve gas selectivity.

10. The method as described in claim 1, further comprising the step of acid doping the hollow fiber in order to improve gas selectivity.

11. The method as described in claim 1, wherein in addition to the EB form of polyaniline, a polymer other than polyaniline is added to the solution in said step of forming a solution of the EB form of polyaniline, whereby a blended integrally skinned, porous asymmetric hollow fiber is formed.

12. The method as described in claim 11, wherein said polymer comprises polysulfones.

* * * * *